(12) United States Patent
Mueck et al.

(10) Patent No.: US 12,280,807 B2
(45) Date of Patent: Apr. 22, 2025

(54) INTEGRATING ARTIFICIAL INTELLIGENCE INTO VEHICLES

(71) Applicant: Intel Corporation, Santa Clara, CA (US)

(72) Inventors: Markus Dominik Mueck, Unterhaching (DE); Leonardo Gomes Baltar, Munich (DE)

(73) Assignee: Intel Corporation, Santa Clara, CA (US)

( * ) Notice: Subject to any disclaimer, the term of this patent is extended or adjusted under 35 U.S.C. 154(b) by 114 days.

(21) Appl. No.: 17/915,947

(22) PCT Filed: Apr. 30, 2021

(86) PCT No.: PCT/US2021/030242
§ 371 (c)(1),
(2) Date: Sep. 29, 2022

(87) PCT Pub. No.: WO2021/222794
PCT Pub. Date: Nov. 4, 2021

(65) Prior Publication Data
US 2023/0143822 A1    May 11, 2023

Related U.S. Application Data

(60) Provisional application No. 63/018,194, filed on Apr. 30, 2020.

(51) Int. Cl.
*B60W 60/00* (2020.01)
*H04W 12/06* (2021.01)

(52) U.S. Cl.
CPC ...... *B60W 60/00188* (2020.02); *H04W 12/06* (2013.01)

(58) Field of Classification Search
None
See application file for complete search history.

(56) References Cited

U.S. PATENT DOCUMENTS 10,037,689 B2 * 7/2018 Taylor ................. G05D 1/0285
10,523,679 B2 * 12/2019 Glass ..................... H04L 63/20
(Continued)

FOREIGN PATENT DOCUMENTS

JP     2020035217 A * 3/2020 ............ B60W 40/06
JP     2020184369 A * 11/2020 ...... B60W 60/00256
(Continued)

OTHER PUBLICATIONS

Norton Rose Fulbright. "The Privacy Implications of Autonomous Vehicles." (Jul. 17, 2017). Retrieved online Jul. 31, 2024. https://www.dataprotectionreport.com/2017/07/the-privacy-implications-of-autonomous-vehicles/ (Year: 2017).*
(Continued)

*Primary Examiner* — James A Reagan
(74) *Attorney, Agent, or Firm* — Schwegman Lundberg & Woessner, P.A.

(57) ABSTRACT

Systems and methods may be used for vehicle support or operation. A method may be performed using an edge device to support operations of a vehicle. The method may include receiving a request from a vehicle component to register with an artificial intelligence processing component of the edge device, sending an acknowledgement of the registration to the vehicle component, receiving a request for a service of the artificial intelligence processing component, and providing, to the vehicle component in response to the request, a response from the service.

12 Claims, 13 Drawing Sheets

(56) References Cited

U.S. PATENT DOCUMENTS

| | | | |
|---|---|---|---|
| 10,948,476 B2* | 3/2021 | Troxler | G01N 23/00 |
| 2017/0337813 A1* | 11/2017 | Taylor | G05D 1/0285 |
| 2018/0220309 A1* | 8/2018 | Gomes | G05D 1/0022 |
| 2018/0295518 A1* | 10/2018 | Alloche | H04L 9/3268 |
| 2019/0215325 A1* | 7/2019 | Glass | H04W 4/46 |
| 2019/0265222 A1* | 8/2019 | Troxler | G01N 9/00 |
| 2019/0312855 A1* | 10/2019 | Sharma | G06F 16/27 |
| 2020/0269861 A1* | 8/2020 | Liffman | G05D 1/0214 |
| 2021/0144517 A1* | 5/2021 | Guim Bernat | H04L 9/3247 |
| 2021/0192650 A1* | 6/2021 | Hunn | G06F 16/93 |
| 2022/0038554 A1* | 2/2022 | Merwaday | H04L 45/64 |
| 2022/0126864 A1* | 4/2022 | Moustafa | G06T 1/0007 |

FOREIGN PATENT DOCUMENTS

| | | | | |
|---|---|---|---|---|
| KR | 20190104474 A | 9/2019 | | |
| WO | WO-2009118624 A1 * | 10/2009 | | B60W 40/072 |
| WO | WO-2017035536 A1 | 3/2017 | | |
| WO | WO-2018182732 A1 | 10/2018 | | |
| WO | WO-2021222794 A1 | 11/2021 | | |

OTHER PUBLICATIONS

Nils Haustein. "Data Platform for ADAS and Autonomous Driving Development." (May 16, 2019). Retrieved online Jul. 31, 2024. https://www.spectrumscaleug.org/wp-content/uploads/2019/05/SSSD19DE-Day-2-B01-Spectrum-Scale-as-Data-Platform-for-ADAS-and-Autonomous-Driving-Development.pdf (Year: 2019).*

Baruch Feigenbaum. "Autonomous Vehicles: a Guide for Policymakers." (Mar. 2018). Retrieved online Jul. 31, 2024 . https://reason.org/wp-content/uploads/2018/03/autonomous-vehicles-guide-for-policymakers.pdf (Year: 2018).*

"International Application Serial No. PCT US2021 030242, International Preliminary Report on Patentability mailed Nov. 10, 2022", 7 pgs.

"A functional reference architecture for autonomous driving", Information and Software Technologyvol. 73, (May 2016), pp. 136-150.

"ETSI GS ENI 005 V2.1.1", Experiential Networked Intelligence (ENI); System Architecture, (Dec. 2021), 174 pgs.

"Radio Equipment Directive (RED)", [Online]. Retrieved from the Internet: URL: https: single-market-economy.ec.europa.eu sectors electrical-and-electronic-engineering-industries-eei radio-equipment-directive-red_en, (2021), 3 pgs.

"The EU Cybersecurity Act", [Online]. Retrieved from the Internet: URL: https: digital-strategy.ec.europa.eu en policies cybersecurity-act, (Jun. 7, 2022), 6 pgs.

"Cybersecurity for Connected Products", Position Paper, ANEC-Digital-2018-G-001final—BEUC-X-20-18-20217, (Mar. 7, 2018).

"International Application Serial No. PCT/US2021/030242, International Search Report mailed Jul. 9, 2021", 5 pgs.

"International Application Serial No. PCT/US2021/030242, Written Opinion mailed Jul. 9, 2021", 5 pgs.

"Multi-access Edge Computing (MEC); Phase 2: Use Cases and Requirements", ETSI GS MEC 002 V2.1.1, (Oct. 2018), 1-66.

Sophia, Antipolis, "Artificial Intelligence for Networks: Understanding it through ETSI ENI use cases and architecture", (Apr. 20, 2020).

"European Application Serial No. 21796213.3, Communication Pursuant to Rule 164(1) EPC mailed May 8, 2024", 12 pgs.

"European Application Serial No. 21796213.3, Extended European Search Report mailed Jul. 29, 2024", 11 pgs.

* cited by examiner

| TAGGING ID (RELATING TO RED, CYBERSECURITY ACT, ETC.) | TAGGING AUTHORITY (E.G., MANUFACTURER) | TAGGING CONFIRMATION CODE (E.G., ENCRYPTION KEY) | PUBLIC TAGGING INFORMATION TO BE SHARED ON REQUEST | PRIVATE TAGGING INFORMATION TO BE SHARED ON AUTHORIZED REQUEST |
|---|---|---|---|---|

FIG. 10

INTEGRATING ARTIFICIAL INTELLIGENCE INTO VEHICLES

CLAIM OF PRIORITY

This application is a U.S. National Stage Application under 35 U.S.C. 371 from International Application No. PCT/US2021/030242, filed Apr. 30, 2021, published as WO 2021/222794, which claims the benefit of priority to U.S. Provisional Application Ser. No. 63/018,194, filed Apr. 30, 2020, titled "INTEGRATING ARTIFICIAL INTELLIGENCE INTO AUTONOMOUS VEHICLES," all of which are hereby incorporated herein by reference in their entirety.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with artificial intelligence techniques. Limited standards have been developed by the European Telecommunications Standards Institute (ETSI) Experiential Networked intelligence (ENI) industry specification group (ISG) in an attempt to define common interfaces for operation of artificial intelligence systems, platforms, hosts, services, and applications.

Edge computing and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 10 illustrates an example tagging data structure, according to an example;

DETAILED DESCRIPTION

Figure 1:
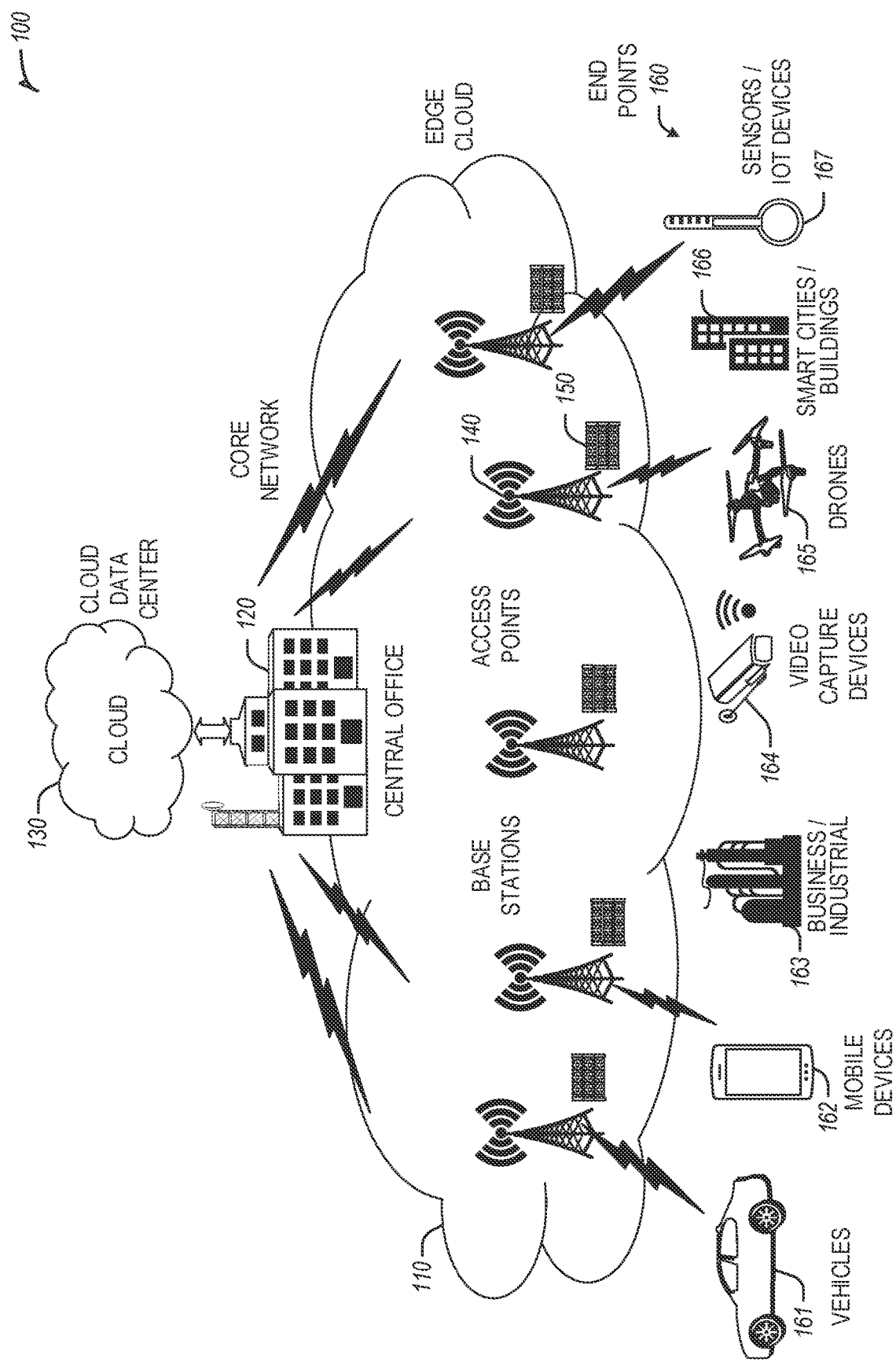
FIG. 1 illustrates an overview of an edge cloud configuration or edge computing, according to an example.

In the following description, methods, configurations, and related apparatuses are disclosed for integrating components or subsystems of Autonomous Vehicles (AV) with artificial intelligence (AI) components or subsystems based on the ETSI ENI framework. In previous solutions, an AI framework was developed independently by each manufacturer in a proprietary fashion for its own AV technology. This leads to higher costs, longer development cycles and reusage issues if new vehicle generations build on different platform choices. The systems and methods herein describe how to integrate AVs internal and external components and subsystems into the existing AI platform and framework proposed by ETSI ENI, while expanding such frameworks and platforms for more advanced edge computing and autonomous vehicle use cases.

The systems and methods described herein relate to certificate tagging of components or subsystems for security. The security may include levels, for example based on regulation (such as by the European Union or the United States). Regulations may include a Radio Equipment Directive (RED), which, in its Article 3, requires (e.g., split up in sub-articles 3(3)(a) . . . 3(3)(i)) certain security measures be taken for radio equipment to be permitted to the European market. These security measures include requirements by Article 3(3)(e) on privacy requirements (for data) and Article 3(3)(f) on fraud/cybersecurity, for example. Another regulation may include an EU Cybersecurity Act, which introduces an EU-wide cybersecurity certification framework for ICT products, services and processes. The European Commission Stakeholder Cybersecurity Certification Group (SCCG) has been recently created to develop related certification mechanisms.

Any component or subsystem (e.g., radio or processing) of an Autonomous Vehicle (AV) may relate to one or more of the requirements of the RED or the Cybersecurity Act. The systems and methods described herein provide a tag for AV components and subsystems. The tag may be used to verify which AV component or subsystem meets which RED/Cybersecurity Act requirements and whether the AV component or subsystem meets all RED/Cybersecurity Act requirements. Also, this tagging helps to identify whether some AV components or sub-systems may violate European requirements although they are allowed in other regions (such as US/Asia, e.g., the national institute of standards and technology (NIST) in the US, such as the NIST Cyber Security Framework, or region specific tagging, national specific tagging, etc.). Those components or subsystem must be de-activated.

Certification for RED or the Cybersecurity Act may include: RED related certification (in particular fraud/cybersecurity related certification in relation to RED Article 3(3)(f)), including RED certification related to RED Article 3(3)(f) on fraud/cybersecurity is expected to require certain hardware features, typically including requirements for protected memory, requirements for a Trusted Platform Module (TPM), requirements for Operating Systems (e.g., specific robust exception handling mechanisms, etc.), etc. Certification for Cybersecurity Act may include: certification related to the usage of hardware components mandated by the RED, for example: which encryption key(s) should be saved in a TPM and how they should be accessed/used, which protocol should be used for secure exchange of data that may relate to the privacy of the user, or the like.

FIG. 1 is a block diagram 100 showing an overview of a configuration for edge computing, which includes a layer of processing referenced in many of the current examples as an "edge cloud". This network topology, which may include a number of conventional networking layers (including those not shown herein), may be extended through use of the AI platform or data tagging techniques and configurations discussed herein.

As shown, the edge cloud 110 is co-located at an edge location, such as the base station 140, a local processing hub 150, or a central office 120, and thus may include multiple entities, devices, and equipment instances. The edge cloud 110 is located much closer to the endpoint (consumer and producer) data sources 160 (e.g., vehicles 161, user equipment 162, business and industrial equipment 163, video capture devices 164, drones 165, smart cities and building devices 166, sensors and IoT devices 167, etc.) than the cloud data center 130. In an example, vehicles 161 may include an autonomous vehicle, such as a vehicle that includes one or more components that aid a driver (e.g., driver support features) or are autonomous, acting without driver attention (e.g., automated driving features). These components may include various levels based on degree of automation. Driver support features may include features that provide alerts or minor or brief changes to vehicle operations, such as lane alerts, adaptive cruise control, blind spot warning, automatic braking (e.g., emergency or in back-up mode), or the like. Automated driving features may include traffic routing, entirely driverless vehicles or modes, or the like.

Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices than at a base station or at a central office). However, the closer that the edge location is to the endpoint (e.g., UEs), the more that space and power is constrained. Thus, edge computing, as a general design principle, attempts to minimize the amount of resources needed for network services, through the distribution of more resources which are located closer both geographically and in network access time.

The following involves aspects of an edge cloud architecture that covers multiple potential deployments and addresses restrictions that some network operators or service providers may have in their own infrastructures. These include, variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. These and other scenarios may involve the use of attestation, as provided in the discussion below.

In contrast to the network architecture of FIG. 1, traditional endpoint connection (e.g., UE-to everything, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud datacenter.

Figure 2:
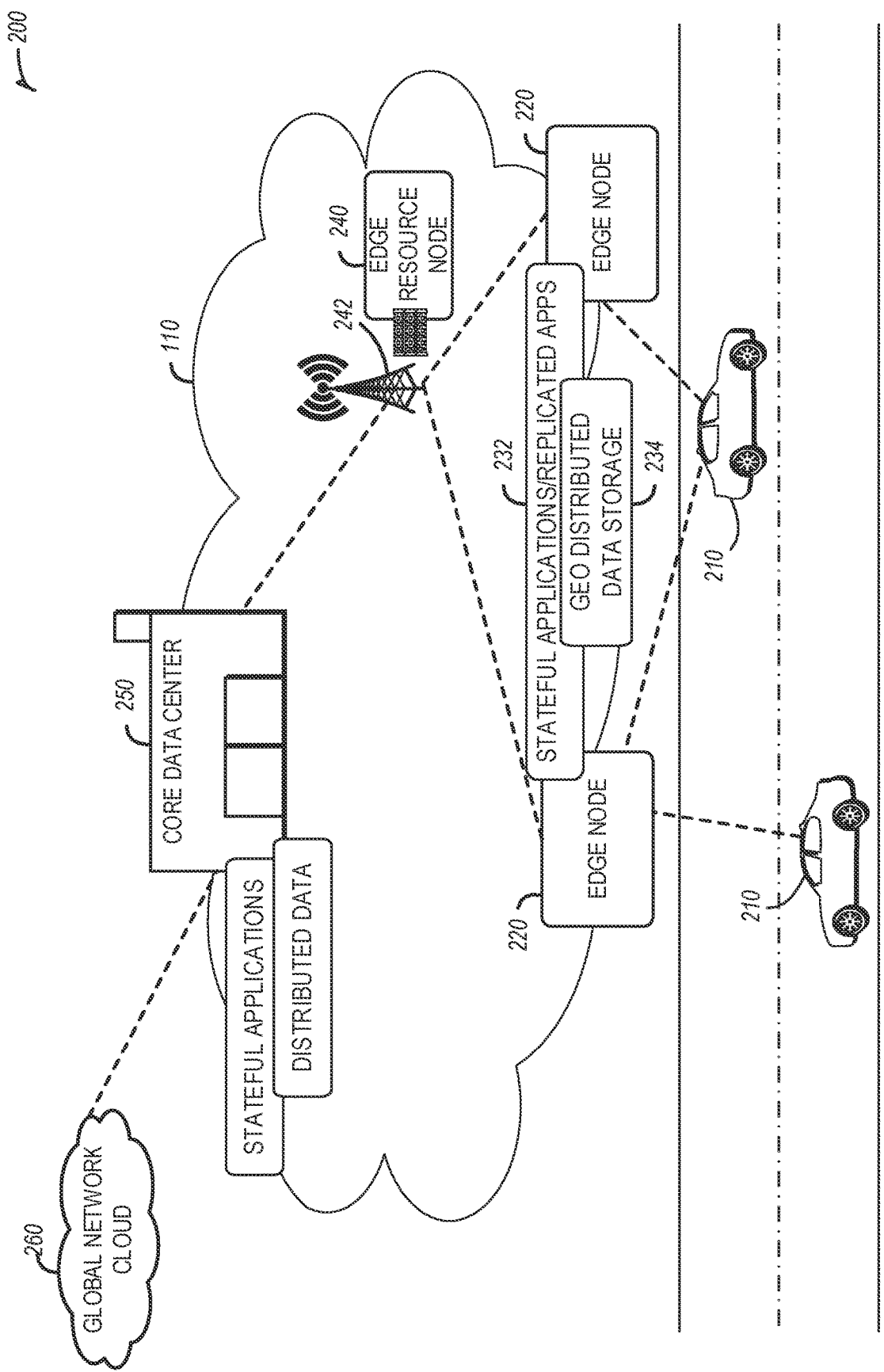
FIG. 2 illustrates a vehicle compute and communication use case involving mobile access to applications in an edge computing system, according to an example.

FIG. 2 shows a simplified vehicle compute and communication use case involving mobile access to applications in an edge computing system 200 that implements an edge cloud 110. In this use case, each client compute node 210 may be embodied as in-vehicle compute systems (e.g., in-vehicle navigation and/or infotainment systems) located in corresponding vehicles that communicate with the edge gateway nodes 220 during traversal of a roadway. For instance, edge gateway nodes 220 may be located in roadside cabinets, which may be placed along the roadway, at intersections of the roadway, or other locations near the roadway. As each vehicle traverses along the roadway, the connection between its client compute node 210 and a particular edge gateway node 220 may propagate so as to maintain a consistent connection and context for the client compute node 210. Each of the edge gateway nodes 220 includes some processing and storage capabilities and, as such, some processing and/or storage of data for the client compute nodes 210 may be performed on one or more of the edge gateway nodes 220.

Each of the edge gateway nodes 220 may communicate with one or more edge resource nodes 240, which are illustratively embodied as compute servers, appliances or components located at or in a communication base station 242 (e.g., a base station of a cellular network). As discussed above, each edge resource node 240 includes some processing and storage capabilities and, as such, some processing and/or storage of data for the client compute nodes 210 may be performed on the edge resource node 240. For example, the processing of data that is less urgent or important may be performed by the edge resource node 240, while the processing of data that is of a higher urgency or importance may be performed by edge gateway devices or the client nodes themselves (depending on, for example, the capabilities of each component).

The edge resource node(s) 240 also communicate with the core data center 250, which may include compute servers, appliances, and/or other components located in a central location (e.g., a central office of a cellular communication network). The core data center 250 may provide a gateway to the global network cloud 260 (e.g., the Internet) for the edge cloud 110 operations formed by the edge resource node(s) 240 and the edge gateway nodes 220. Additionally, in some examples, the core data center 250 may include an amount of processing and storage capabilities and, as such, some processing and/or storage of data for the client compute devices may be performed on the core data center 250 (e.g., processing of low urgency or importance, or high complexity). The edge gateway nodes 220 or the edge resource nodes 240 may offer the use of stateful applications 232 and a geographic distributed data storage 234 (e.g., database data store, etc.).

In further examples, FIG. 2 may utilize various types of mobile edge nodes, such as an edge node hosted in a vehicle (e.g., car, truck, tram, train, etc.) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 220, some others at the edge resource node 240, and others in the core data center 250 or global network cloud 260.

In further configurations, the edge computing system may implement Function-as-a-Service (FaaS) computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including a support of respective functions that support edge computing as a service. Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

In further examples, any of the compute nodes or devices discussed with reference to the present edge computing systems and environment may be fulfilled based on the components depicted in FIGS. 3A and 3B. Each edge compute node may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), a road-side unit, a base station, a server, a gateway, or other device or system capable of performing the described functions.

Figure 3A:
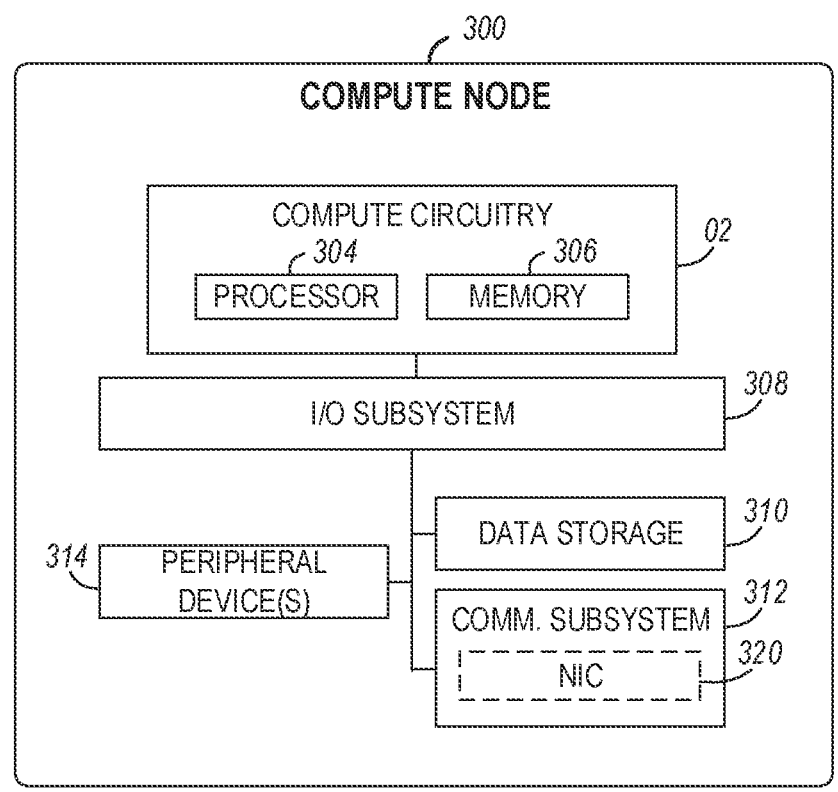
FIG. 3A illustrates an overview of example components deployed at a compute node system, according to an example.

In the simplified example depicted in FIG. 3A, an edge compute node 300 includes a compute engine (also referred to herein as "compute circuitry") 302, an input/output (I/O) subsystem 308, data storage 310, a communication circuitry subsystem 312, and, optionally, one or more peripheral devices 314. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 300 may be embodied as any type of engine, device, or collection of devices capable of performing various compute functions. In some examples, the compute node 300 may be embodied as a single device such as an integrated circuit, an embedded system, a field-programmable gate array (FPGA), a system-on-a-chip (SOC), or other integrated system or device. In the illustrative example, the compute node 300 includes or is embodied as a processor 304 and a memory 306. The processor 304 may be embodied as any type of processor capable of performing the functions described herein (e.g., executing an application). For example, the processor 304 may be embodied as a multi-core processor(s), a microcontroller, or other processor or processing/controlling circuit. In some examples, the processor 304 may be embodied as, include, or be coupled to an FPGA, an application specific integrated circuit (ASIC), reconfigurable hardware or hardware circuitry, or other specialized hardware to facilitate performance of the functions described herein.

The main memory 306 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 306 may be integrated into the processor 304. The main memory 306 may store various software and data used during operation such as one or more applications, data operated on by the application(s), libraries, and drivers.

The compute circuitry 302 is communicatively coupled to other components of the compute node 300 via the I/O subsystem 308, which may be embodied as circuitry and/or components to facilitate input/output operations with the compute circuitry 302 (e.g., with the processor 304 and/or the main memory 306) and other components of the compute circuitry 302. For example, the I/O subsystem 308 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 308 may form a portion of a system-on-a-chip (SoC) and be incorporated, along with one or more of the processor 304, the main memory 306, and other components of the compute circuitry 302, into the compute circuitry 302.

The one or more illustrative data storage devices 310 may be embodied as any type of devices configured for short-term or long-term storage of data such as, for example, memory devices and circuits, memory cards, hard disk drives, solid-state drives, or other data storage devices. Each data storage device 310 may include a system partition that stores data and firmware code for the data storage device 310. Each data storage device 310 may also include one or more operating system partitions that store data files and executables for operating systems depending on, for example, the type of compute node 300.

The communication circuitry subsystem 312 may be embodied as any communication circuit, device, or collection thereof, capable of enabling communications over a network between the compute circuitry 302 and another compute device (e.g., an edge gateway node of an edge computing system). The communication circuitry subsystem 312 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry subsystem 312 includes a network interface controller (NIC) 320, which may also be referred to as a host fabric interface (HFI). The NIC 320 may be embodied as one or more add-in-boards, daughter cards, network interface cards, controller chips, chipsets, or other devices that may be used by the compute node 300 to connect with another compute device (e.g., an edge gateway node). In some examples, the NIC 320 may be embodied as part of a system-on-a-chip (SoC) that includes one or more processors, or included on a multichip package that also contains one or more processors. In some examples, the NIC 320 may include a local processor (not shown) and/or a local memory (not shown) that are both local to the NIC 320. In such examples, the local processor of the NIC 320 may be capable of performing one or more of the functions of the compute circuitry 302 described herein. Additionally or alternatively, in such examples, the local memory of the NIC 320 may be integrated into one or more components of the client compute node at the board level, socket level, chip level, and/or other levels.

Additionally, in some examples, each compute node 300 may include one or more peripheral devices 314. Such peripheral devices 314 may include any type of peripheral device found in a compute device or server such as audio input devices, a display, other input/output devices, interface devices, and/or other peripheral devices, depending on the particular type of the compute node 300. In further examples, the compute node 300 may be embodied by a respective edge compute node in an edge computing system (e.g., client compute node, edge gateway node, or edge aggregation node) or like forms of appliances, computers, subsystems, circuitry, or other components.

Figure 3B:
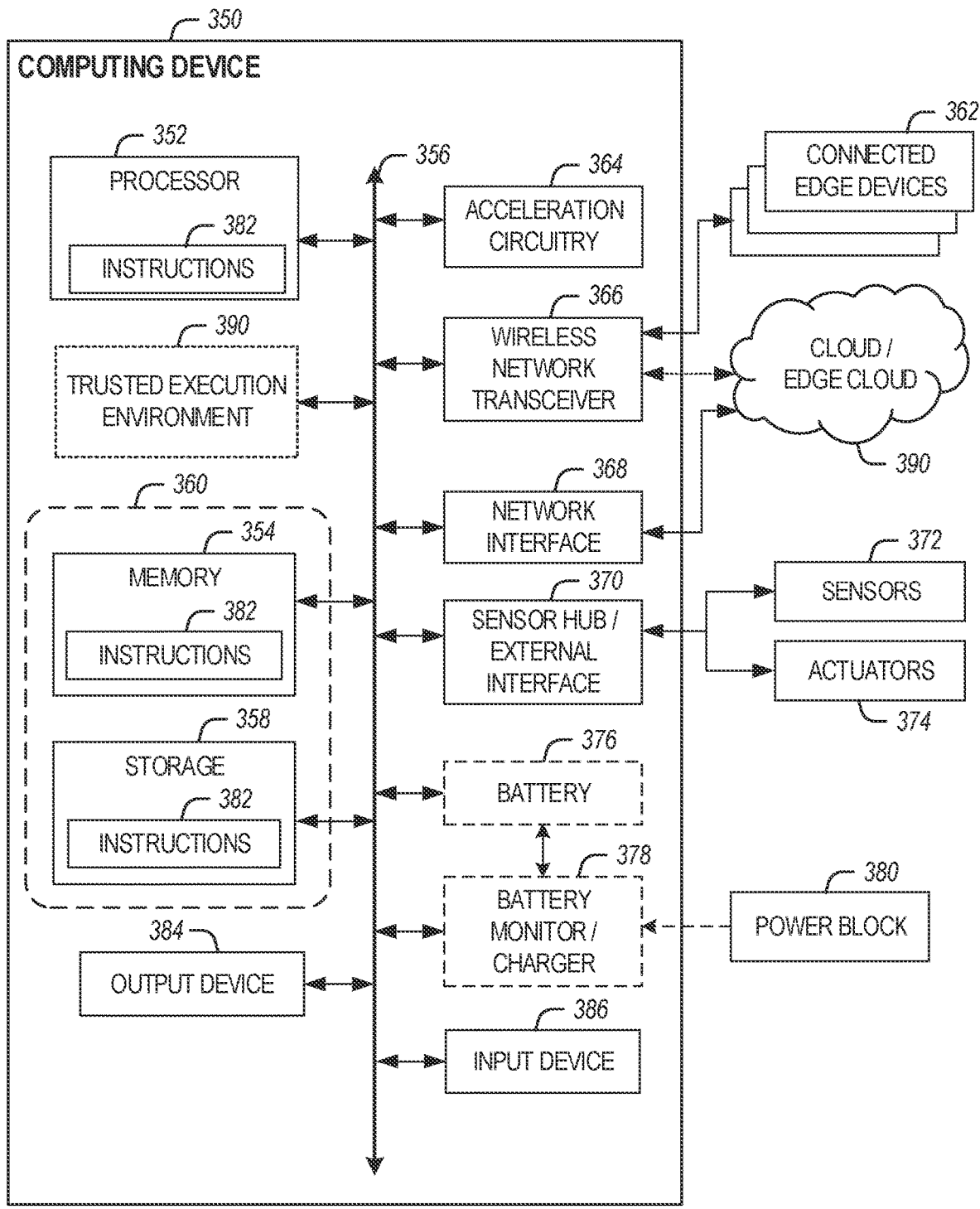
FIG. 3B illustrates a further overview of example components within a computing device, according to an example.

In a more detailed example, FIG. 3B illustrates a block diagram of an example of components that may be present in an edge computing node 350 for implementing the techniques (e.g., operations, processes, methods, and methodologies) described herein. The edge computing node 350 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 350, or as components otherwise incorporated within a chassis of a larger system.

The edge computing node 350 may include processing circuitry in the form of a processor 352, which may be a microprocessor, a multi-core processor, a multithreaded processor, an ultra-low voltage processor, an embedded processor, or other known processing elements. The processor 352 may be a part of a system on a chip (SoC) in which the processor 352 and other components are formed into a single integrated circuit, or a single package, such as the Edison™ or Galileo™ SoC boards from Intel Corporation, Santa Clara, California As an example, the processor 352 may include an Intel® Architecture Core™ based processor, such as a Quark™, an Atom™, an i3, an i5, an i7, an i9, or an MCU-class processor, or another such processor available from Intel®. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 352 may communicate with a system memory 354 over an interconnect 356 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be, referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 358 may also couple to the processor 352 via the interconnect 356. In an example, the storage 358 may be implemented via a solid-state disk drive (SSDD). Other devices that may be used for the storage 358 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 358 may be on-die memory or registers associated with the processor 352. However, in some examples, the storage 358 may be implemented using a micro hard disk drive (HDD). Further, any number of new technologies may be used for the storage 358 in addition to, or instead of, the technologies described, such resistance change memories, phase change memories, holographic memories, or chemical memories, among others.

The components may communicate over the interconnect 356. The interconnect 356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 356 may be a proprietary bus, for example, used in an SoC based system. Other bus systems may be included, such as an I2C interface, an SPI interface, point to point interfaces, and a power bus, among others.

The interconnect 356 may couple the processor 352 to a transceiver 366, for communications with the connected edge devices 362. The transceiver 366 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 362. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 366 (or multiple transceivers) may communicate using multiple standards or radios for communications at a different range. For example, the edge computing node 350 may communicate with close devices, e.g., within about 10 meters, using a local transceiver based on BLE, or another low power radio, to save power. More distant connected edge devices 362, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 366 (e.g., a radio transceiver) may be included to communicate with devices or services in the edge cloud 390 via local or wide area network protocols. The wireless network transceiver 366 may be an LPWA transceiver that follows the IEEE 802.15.4, or IEEE 802.15.4g standards, among others. The edge computing node 350 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 366, as described herein. For example, the transceiver 366 may include a cellular transceiver that uses spread spectrum (SPA/SAS) communications for implementing high-speed communications. Further, any number of other protocols may be used, such as Wi-Fi® networks for medium speed communications and provision of network communications. The transceiver 366 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 368 may be included to provide a wired communication to nodes of the edge cloud 390 or to other devices, such as the connected edge devices 362 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 368 may be included to enable connecting to a second network, for example, a first NIC 368 providing communications to the cloud over Ethernet, and a second NIC 368 providing communications to other devices over another type of network.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LIE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMIS), Advanced Mobile Telephone System (AMTS), OLT (Norwegian for Offentlig Landmobil Telefoni, Public Land Mobile Telephony), MID (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11 ad, IEEE 802.11ay, etc.), technologies operating above 300 GHz and THz bands, (3GPP/LTE, based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e. Operation of ITS-G5 in European ITS frequency bands dedicated to ITS for safety re-laced applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (e.g., allocated for example in US (FCC Part 15)), 863-868.6 MHz (note: allocated for example in European Union (ETSI EN 300 220)), 915.9-929.7 MHz (e.g., allocated for example in Japan), 917-923.5 MHz (e.g., allocated for example in South Korea), 755-779 MHz and 779-787 MHz (e.g., allocated for example in China), 790-960 MHz, 1710-2025 MHz, 2110-2200 MHz, 2300-2400 MHz, 2.4-24835 GHz (e.g., an ISM band with global availability, which may be used by Wi-Fi technology family (11b/g/n/ax) or by Bluetooth), 2500-2690 MHz, 698-790 MHz, 610-790 MHz, 3400-3600 MHz, 3400-3800 MHz, 3.55-3.7 GHz (e.g., allocated for example in the US for Citizen Broadband Radio Service), 5.15-5.25 GHz and 5.25-5.35 GHz and 5.47-5.725 GHz and 5.725-5.85 GHz bands (e.g., allocated for example in the US (FCC part 15), including four U-NII bands in total 500 MHz spectrum), 5.725-5.875 GHz (e.g., allocated for example in EU (ETSI EN 301 893)), 5.47-565 GHz (e.g., allocated for example in South Korea, 5925-7125 MHz and 5925-6425 MHz band (e.g., in US and EU, respectively, where a Wi-Fi system may include the 6 GHz spectrum as operating band), IMT-advanced spectrum, IMT-2020 spectrum (e.g., including 3600-3800 MHz, 3.5 GHz bands, 700 MHz bands, bands within the 24.25-86 GHz range, etc.), spectrum made available under FCC's "Spectrum frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (5724-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., this band may have near-global designation for Multi-Gigabit Wireless Systems (MGWS)/WiGig). In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, or bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-TDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features in this document are defined for the network side, such as Access Points, eNodeBs, New Radio (NR) or next generation Node Bs (gNodeB or gNB—in an example, this term may be used in the context of 3GPP fifth generation (5G) communication systems), etc. Still, a User Equipment (UE) may take this role as well and act as an Access Points, eNodeBs, gNodeBs, etc. I.e., some or all features defined for network equipment may be implemented by a UE.

Given the variety of types of applicable communications from the device to another component or network, applicable communications circuitry used by the device may include or be embodied by any one or more of components 364, 366, 368, or 370. Accordingly, in various examples, applicable means for communicating (e.g., receiving, transmitting, etc.) may be embodied by such communications circuitry.

The edge computing node 350 may include or be coupled to acceleration circuitry 364, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 356 may couple the processor 352 to a sensor hub or external interface 370 that is used to connect additional devices or subsystems. The devices may include sensors 372, such as accelerometers, level sensors, flow sensors, optical light sensors, camera sensors, temperature sensors, a global positioning system (GPS) sensors, pressure sensors, barometric pressure sensors, and the like. The hub or interface 370 further may be used to connect the edge computing node 350 to actuators 374, such as power switches, valve actuators, an audible sound generator, a visual warning device, and the like.

In some optional examples, various input/output (I/O) devices may be present within or connected to, the edge computing node 350. For example, a display or other output device 384 may be included to show information, such as sensor readings or actuator position. An input device 386, such as a touch screen or keypad may be included to accept input. An output device 384 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 350.

A battery 376 may power the edge computing node 350, although, in examples in which the edge computing node 350 is mounted in a fixed location, it may have a power supply coupled to an electrical grid. The battery 376 may be a lithium ion battery, or a metal-air battery, such as a zinc-air battery, an aluminum-air battery, a lithium-air battery, and the like.

A battery monitor/charger 378 may be included in the edge computing node 350 to track the state of charge (SoCh) of the battery 376. The battery monitor/charger 378 may be used to monitor other parameters of the battery 376 to provide failure predictions, such as the state of health (SoH) and the state of function (SoF) of the battery 376. The battery monitor/charger 378 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 378 may communicate the information on the battery 376 to the processor 352 over the interconnect 356. The battery monitor/charger 378 may also include an analog-to-digital (ADC) converter that enables the processor 352 to directly monitor the voltage of the battery 376 or the current flow from the battery 376. The battery parameters may be used to determine actions that the edge computing node 350 may perform, such as transmission frequency, mesh network operation, sensing frequency, and the like.

A power block 380, or other power supply coupled to a grid, may be coupled with the battery monitor/charger 378 to charge the battery 376. In some examples, the power block 380 may be replaced with a wireless power receiver to obtain the power wirelessly, for example, through a loop antenna in the edge computing node 350. A wireless battery charging circuit, such as an LTC4020 chip from Linear Technologies of Milpitas, California, among others, may be included in the battery monitor/charger 378. The specific charging circuits may be selected based on the size of the battery 376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 358 may include instructions 382 in the form of software, firmware, or hardware commands to implement the techniques described herein. Although such instructions 382 are shown as code blocks included in the memory 354 and the storage 358, it may be understood that any of the code blocks may be replaced with hardwired circuits, for example, built into an application specific integrated circuit (ASIC).

In an example, the instructions 382 provided via the memory 354, the storage 358, or the processor 352 may be embodied as a non-transitory, machine-readable medium 360 including code to direct the processor 352 to perform electronic operations in the edge computing node 350. The processor 352 may access the non-transitory, machine-readable medium 360 over the interconnect 356. For instance, the non-transitory, machine-readable medium 360 may be embodied by devices described for the storage 358 or may include specific storage units such as optical disks, flash drives, or any number of other hardware devices. The non-transitory, machine-readable medium 360 may include instructions to direct the processor 352 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 3A and 3B are intended to depict a high-level view of components of a device, subsystem, or arrangement of an edge computing node. However, it will be understood that some of the components shown may be omitted, additional components may be present, and a different arrangement of the components shown may occur in other implementations.

Figure 4:
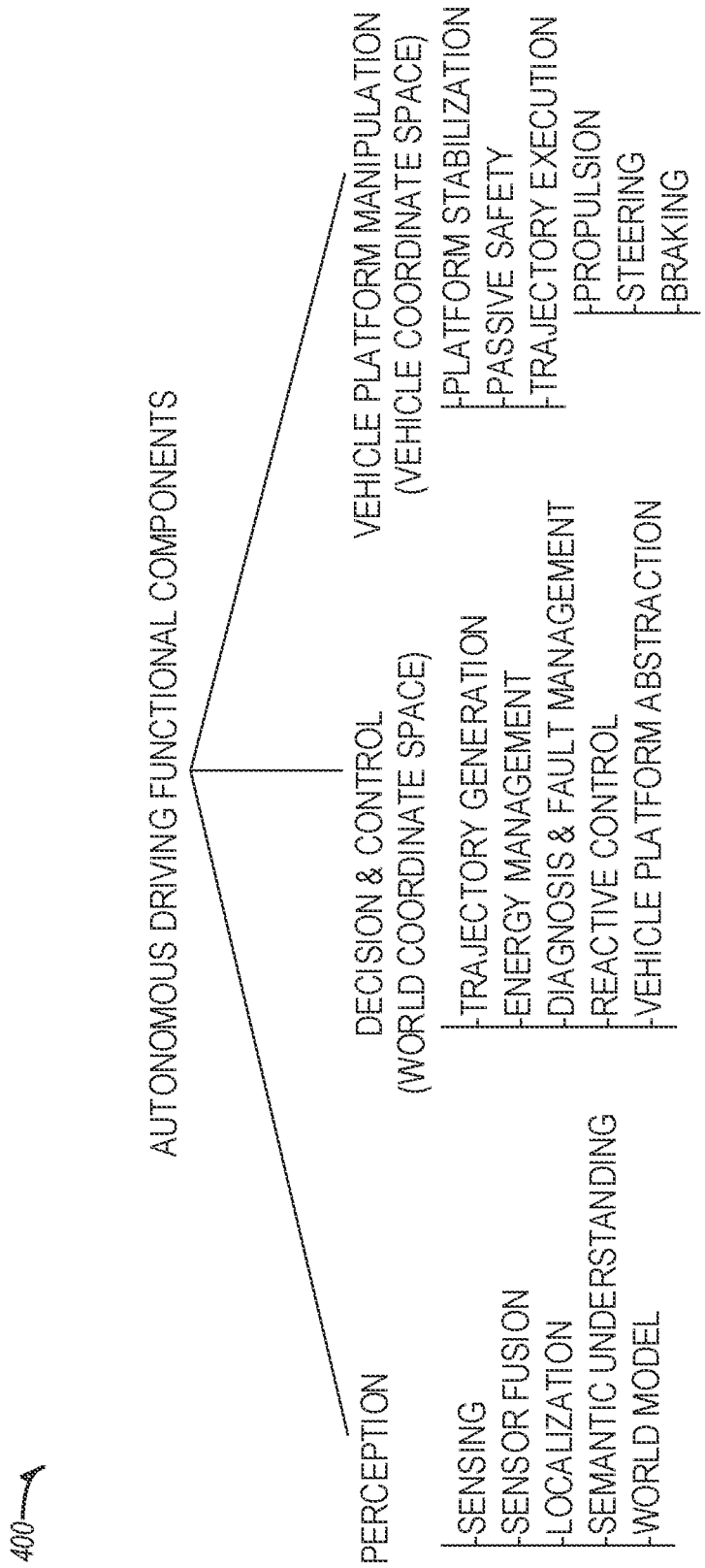
FIG. 4 illustrates example components of an autonomous driving system, according to an example.

FIG. 4 illustrates example components of an autonomous driving system 400, according to an example. The autonomous driving system 400 includes categories that are illustrated for convenience, but may include overlapping components, different subcomponents not illustrated, or may swap components with other categories. The components of the autonomous driving system 400 include a Perception component, a Decision and Control component (e.g., operating with information in a world coordinate space), and a Vehicle Platform Manipulation component (e.g., operating with information in a vehicle coordinate space). The Perception component may include sensing, sensor fusion, localization, semantic understanding, a world model, or other perception aspects used to operate an autonomous vehicle. The Decision and Control component may include trajectory generation, energy management, diagnosis and fault management, reactive control, vehicle platform abstraction, or other world coordinate system aspects used to operate an autonomous vehicle. The Vehicle Platform Manipulation component may include platform stabilization, passive safety, trajectory execution including propulsion, steering, or braking, or the like.

For the groups of Perception and Decision and Control, different approaches may be applied based on whether how many of the components are internal to the AV, for example all, some, or many, and how many are external.

In one extreme all the perception done for the AV is based on sensors and other information passively obtained by the vehicle, and all decision and control are performed by processing units, including AIs, inside of the vehicle (e.g., an entirely internal structure). None or very little wireless communications, as known as V2X (Vehicle-to-Everything) is deployed in this example. For example, the pure reception and broadcast transmission of Basic Safety Messages (BSM) or Cooperative Awareness Messages (CAM) may be deployed, and the information contained is processed by the system similar to an additional passive sensor.

On the other extreme, all perception may occur outside of the vehicle, (e.g., the road infrastructure is equipped with multiple sensors, AVs have fully dependable connection to a wireless network, AVs have very little processing capabilities, and the decision and control happens fully outside of the vehicle in a remote-control set-up). In this extreme, as mentioned, a dependable connection is relied on to receive the perception for determining decision and control (or the decision and control may occur outside the vehicle in some examples).

In practice, a realistic approach frequently seen is an implementation between those two extremes. On one hand, it is useful to have an AV that is able to operate when there is no wireless network or connection available, and on the other hand, cooperation between an AV and support by data processing and consolidation centers in the cloud and the edge, allows for an optimal utilization of computational resources and more efficient traffic operation. In a hybrid approach, a maximum level of safety for an AV may be achieved.

Figure 5:
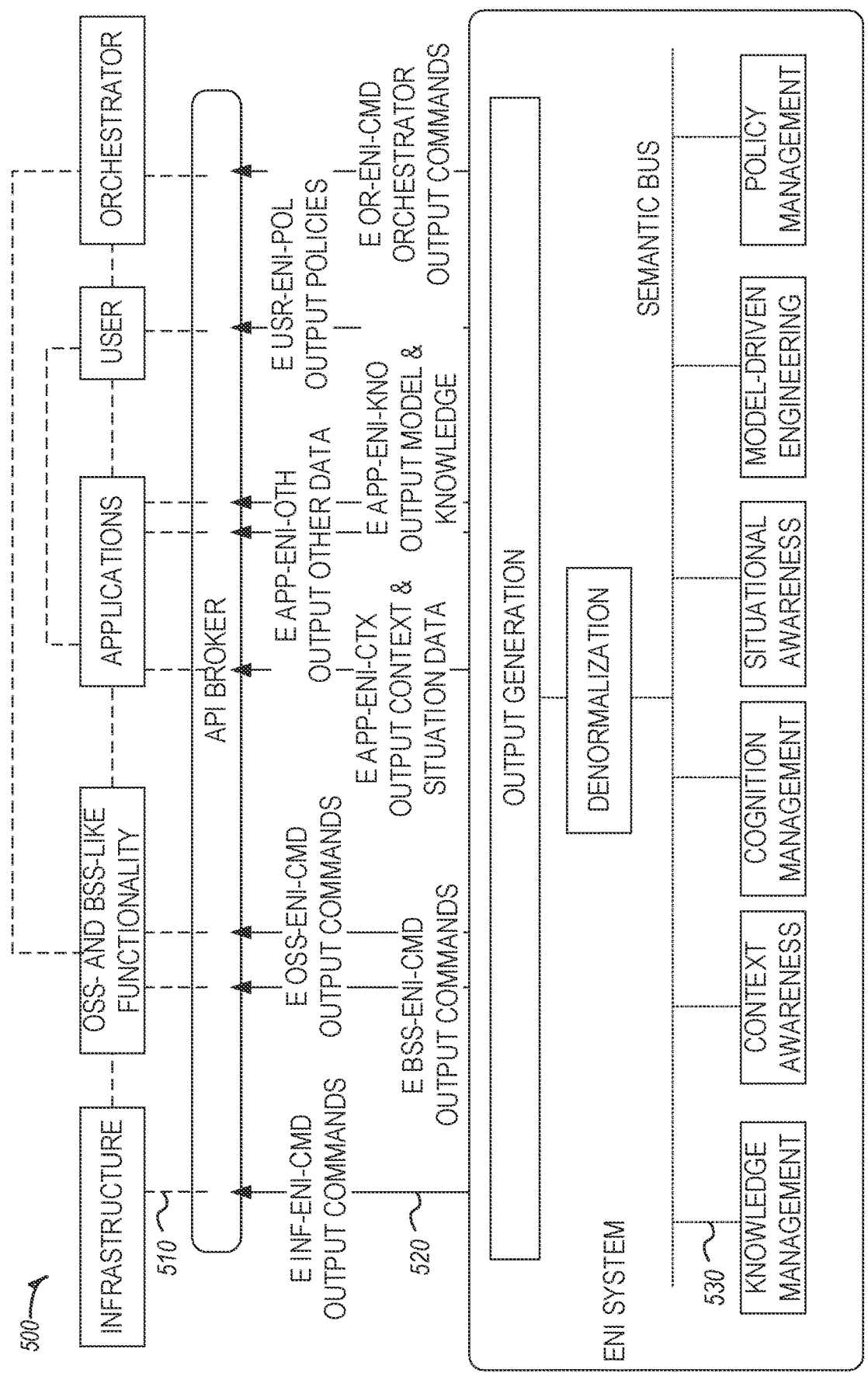
FIG. 5 illustrates an example networked intelligence architecture, according to an example.

The use of AI techniques to solve the problem of control and management of AVs may follow the principles of the control loop model "observe-orient-decide-act", ETSI ENI has developed a framework based in this model for future deployment and operation of mobile networks. The objective there is to automate the complex human-dependent decision-making process. The present systems and methods are used to guide transition from manual to automated driving. FIG. 5 introduces the system architecture to support the AI framework defined by ETSI ENI. ETSI ENI focuses on improving the network operator experience, adding closed-loop AI mechanisms based on context-aware, meta-data-driven policies to more quickly recognize and incorporate new and changed knowledge, and make actionable decisions.

The components or subsystems above may involve combinations of hardware and software, and many of these components will fall into the scope of either or both the RED or the Cybersecurity act in Europe. In particular, the software ruining in those components or subsystems may be able to be updated over-the-air (OTA) in the future.

Some or all of the components or subsystems above may be used with the systems and techniques disclosed herein. For example, an external entity (validated or authenticated, in some examples) may request tag information related to which requirements of RED are met and which requirements of the Cybersecurity Act are met. An external entity may request tag information related to whether a component or subsystem is allowed to be operated in a specific region (including US, Europe, Asia) or in specific countries. An external entity may deactivate specific components or subsystems when operation is not authorized in a specific region (including US, Europe, Asia) or in specific countries, or the like.

FIG. 5 illustrates an example networked intelligence architecture 500, according to an example. The networked intelligence architecture 500 may include or implement an ETSI ENI Architecture (e.g., ETSI GS ENI-005 ENI, System Architecture, of Release 1). In an example, the ENI system components may be operated at the edge, distributed, or in the cloud.

Figure 6:
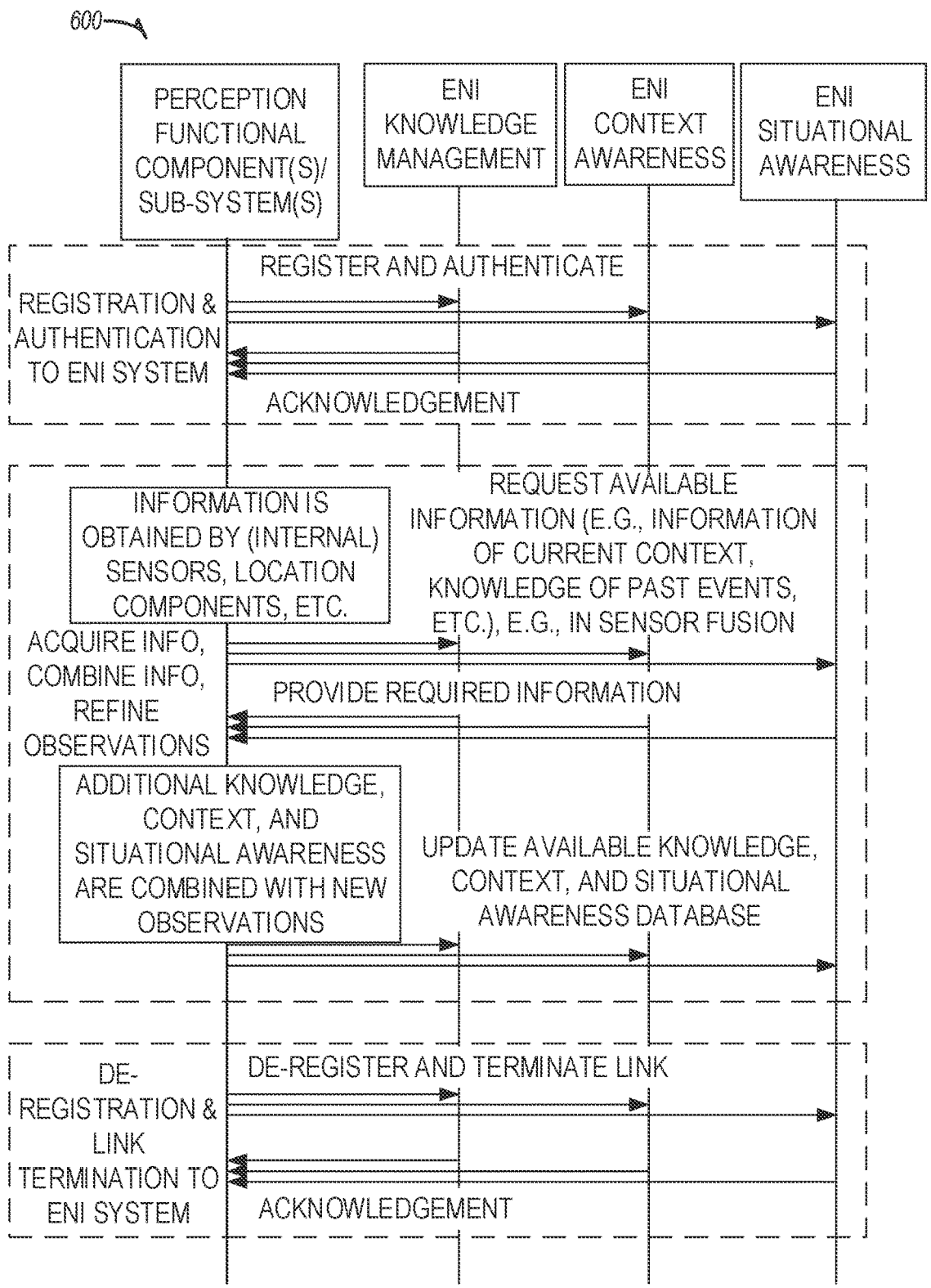
FIG. 6 illustrates an example perception component connection diagram, according to an example.
Figure 7:
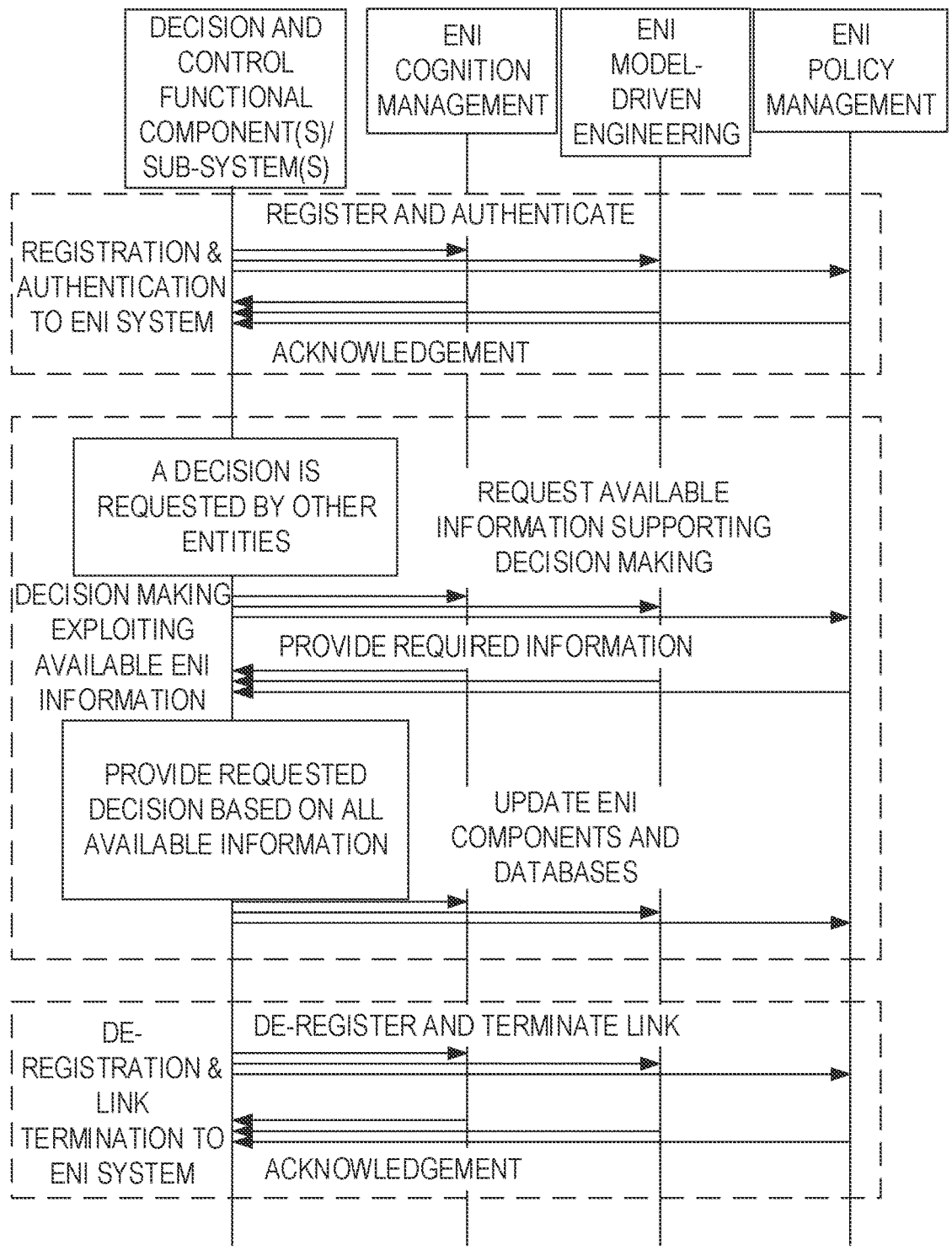
FIG. 7 illustrates an example decision and control component connection diagram, according to an example.
Figure 8:
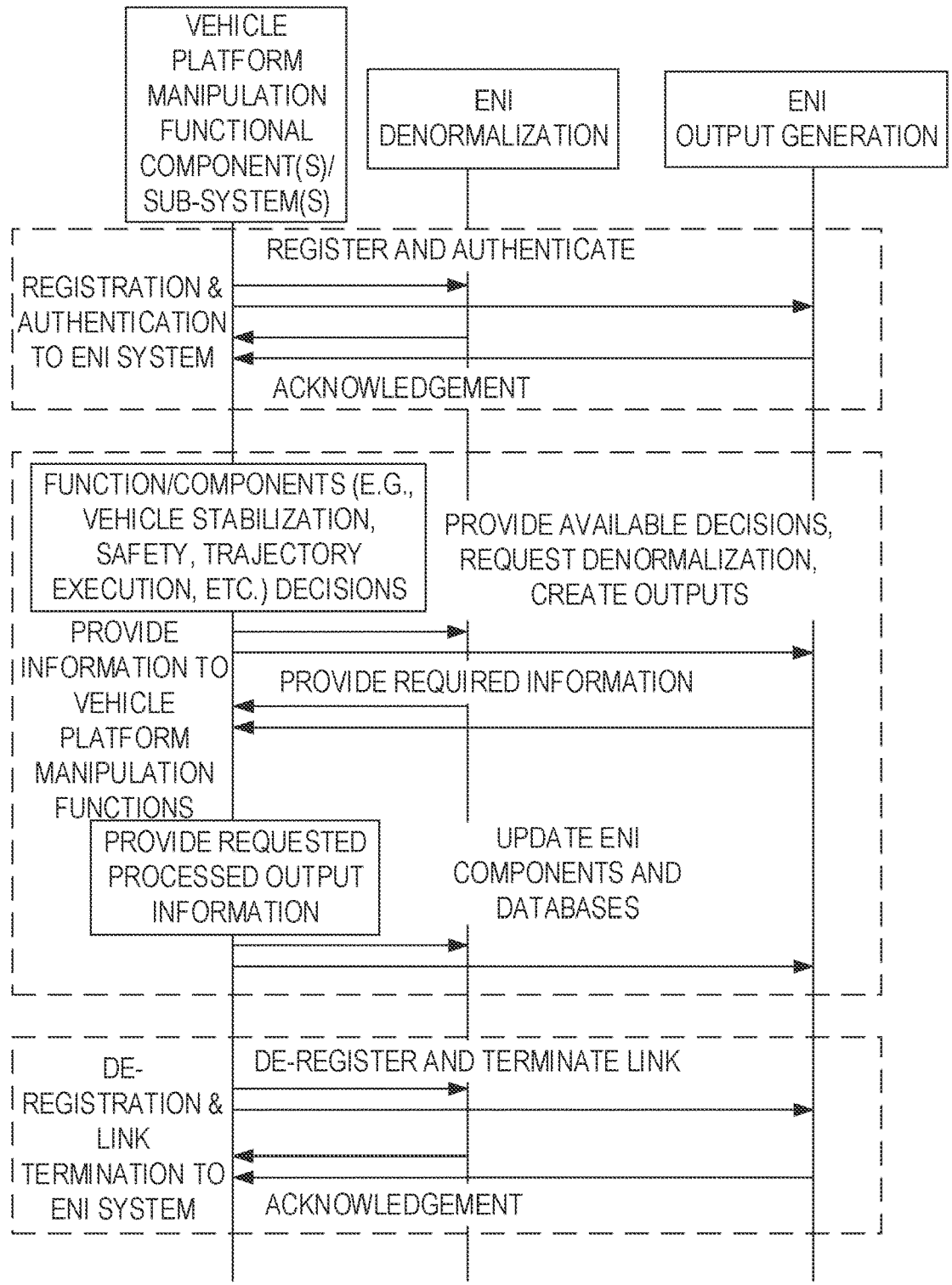
FIG. 8 illustrates an example vehicle platform manipulation component connection diagram, according to an example.

In an example, the internal and external components of an AV have an interaction with the ENI System components as shown in FIGS. 6-8 below. Perception functional components may be associated to the Knowledge Management, Context Awareness, and Situational Awareness components of the networked intelligence architecture 500. Decision and Control functional components may be associated to Cognition Management, Model-Driven Engineering, and Policy Management components of the networked intelligence architecture 500. Vehicle Platform Manipulation functional components may be associated to Denormalization and Output Generation components of the networked intelligence architecture 500.

Dashed lines FIG. 5 (e.g., line 510) represent communication paths that are not defined by ENI. Solid lines in FIG. 5 (e.g., line 520) represent external reference paint connections defined by ENI. Dotted lines in FIG. 5 (e.g., line 530) represent internal reference point connections defined by ENI.

FIG. 6 illustrates an example perception component connection diagram 600, according to an example. The perception component connection diagram 600 shows interactions between the Perception component and the Knowledge Management, Context Awareness, or Situational Awareness components (e.g., of FIG. 5). Interactions may include registration, authentication, information requests such as to support processing of data, knowledge updates, de-registration, link termination, or the like. The Perception component may include cooperative perception with V2X or V2V, such as for understanding context.

FIG. 7 illustrates an example decision and control component connection diagram 700, according to an example. The decision and control component connection diagram 700 shows interactions between the Decision and Control component and the Cognition Management, Model-Driven Engineering, or Policy Management components (e.g., of FIG. 5). Interactions may include registration, authentication, information requests such as to support decision making, knowledge updates, de-registration, link termination, or the like.

FIG. 8 illustrates an example vehicle platform manipulation component connection diagram 800, according to an example. The vehicle platform manipulation component connection diagram 800 shows interactions between the vehicle platform manipulation component and the denormalization or output generation components (e.g., of FIG. 5). Interactions may include registration, authentication, providing information such as decisions available, requesting information such as de-normalization or output creation, de-registration, link termination, or the like.

Figure 9:
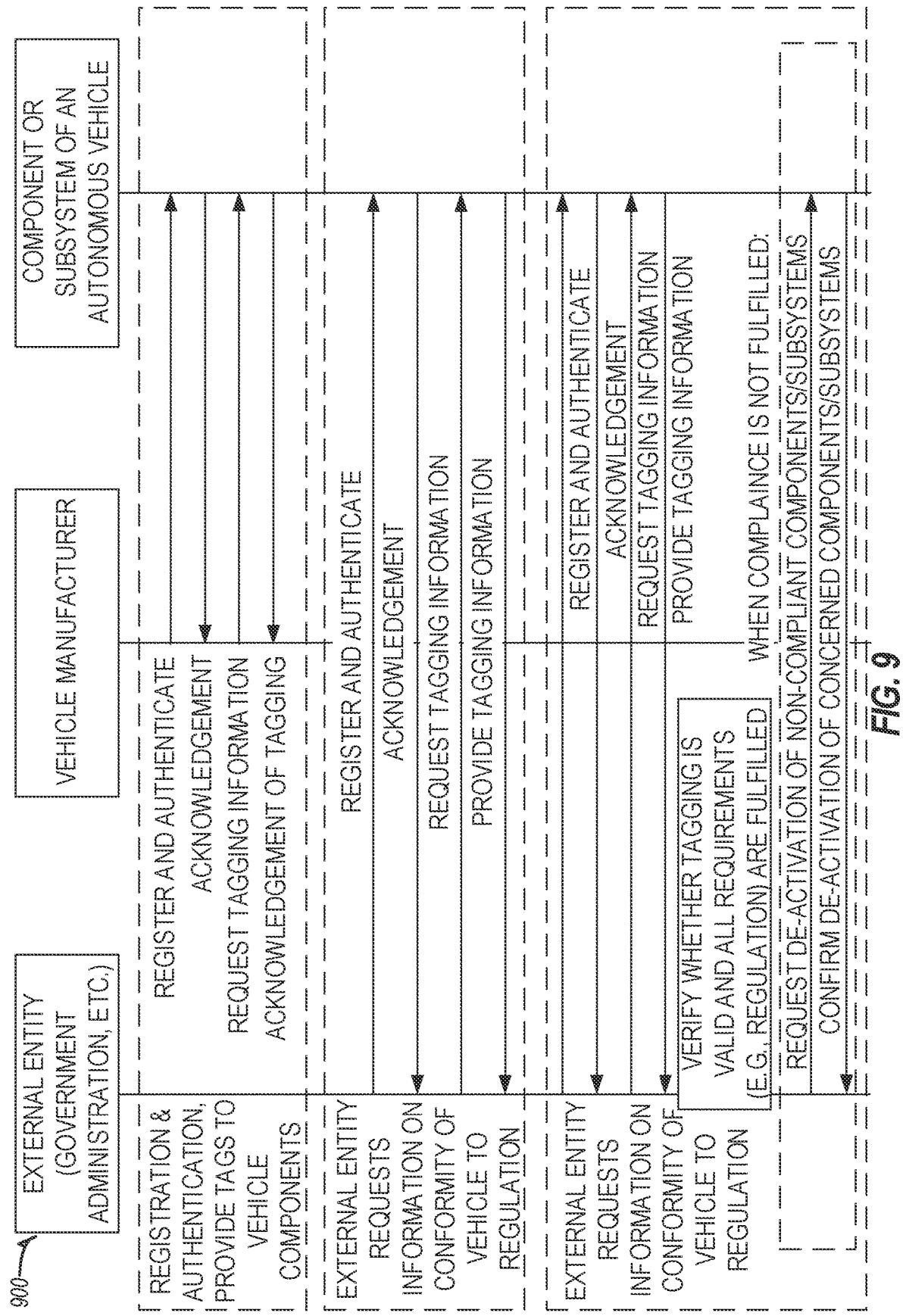
FIG. 9 illustrates an example component tagging connection diagram, according to an example.

FIG. 9 illustrates an example component tagging connection diagram 900, according to an example. Example mechanisms and information between external entities and an autonomous vehicle are outlined in FIG. 9. An external entity, such as a government administration, a manufacturer (which may act as an intermediary), an assembler, etc., may request component security information. Requesting security information may include registration or authentication, a request for a tag, a reply with a tag (which may include use of an intermediary), confirmation of conformity of a component or system, sending information from a tag or sending the tag, or the like. The tag may be verified for issuer, form, or authenticity.

The external entity may request information on conformity of a particular vehicle or particular set of vehicles to a specific regulation (or regulatory framework, such as compliance with all regulations for a region, country, etc.). The external entity may first be registered, authenticated, or validated as being authorized to access the information. After this step, the external entity may send the request for tagging information. The tagging information may be sent in a response from the component or subsystem of an AV to the external entity. When compliance is not fulfilled (e.g., the tag or response indicates that a particular regulation or regulatory framework is not satisfied by the component or subsystem), the external entity may take further action. For example, the external entity may request deactivation of any non-compliant component or subsystem at the AV. The AV may return a response to the request with confirmation of the deactivation.

FIG. 10 illustrates an example tagging data structure 1000, according to an example. There are different possibilities for the structure of the tag. It may include an identification of the component or subsystem, the list of requirements and a check whether each requirement is fulfilled or not. The tagging data structure 1000 may include a tagging identifier, a tagging authority (e.g., manufacturer), a tagging confirmation code (e.g., an encryption key), public tagging information that may be shared on request, or private tagging information that may be shared when a request is authorized, for example.

In response to a request for regulatory compliance information, the tagging data structure 1000 may be accessed (e.g., by a controller or processor of vehicle) for a particular component or subsystem. In some examples, the tagging data structure 1000 may be used to store data for all components and subsystems of a vehicle. In another example, each component or subsystem or a set of components or subsystems may have their own tagging data structure 1000. The tagging data structure 1000 may be stored locally at the vehicle (e.g., in long term storage of the vehicle) or in the cloud (e.g., accessible to the vehicle, but remotely stored). Before replying to a request for a tag, the vehicle may authenticate, register, or validate the requesting entity. In some examples, different information may be available to different entities. For example, a first level of authorization may allow an entity access to the public tagging information of the tagging data structure 1000, while a second level of authorization may allow an entity access to the private tagging information of the tagging data structure 1000. The tagging data structure 1000 may be specific to a component or subsystem, for example with a unique identifier in some examples.

In an example, in response to a request, the tagging data structure 1000 may be sent as a tag to a requesting entity. In other examples, only portions of the tagging data structure 1000 or information from the tagging data structure 1000 may be sent (e.g., as a tag, in a response message, etc.). Information from the tag may be shared directly or may be altered before sending. For example, in some cases the raw data from the tagging data structure 1000 may be sent, while in other cases, more general information such as "complaint" or "non-compliant" may be sent. In some examples, information such as a level of security compliance may be sent (e.g., low, medium, or high) indicating compliance. A highest level of compliance may be used for components or subsystems that have been verified (e.g., by a compliance user) to comply with a relevant regulation (optionally within a specified period of time, such as a day, a week, a month, a year, etc.). A medium compliance level may be used for a component or subsystem that was verified, but after a particular time period has elapsed (e.g., because regulations may have changed), such as a month, a year, etc. In an example, a low compliance level may be used for components or subsystems that are unlikely to be regulated, for components or subsystems where a long time period has passed (e.g., five years) since verification, for components or subsystems that only comply with some regulations but not all, or the like.

Figure 11:
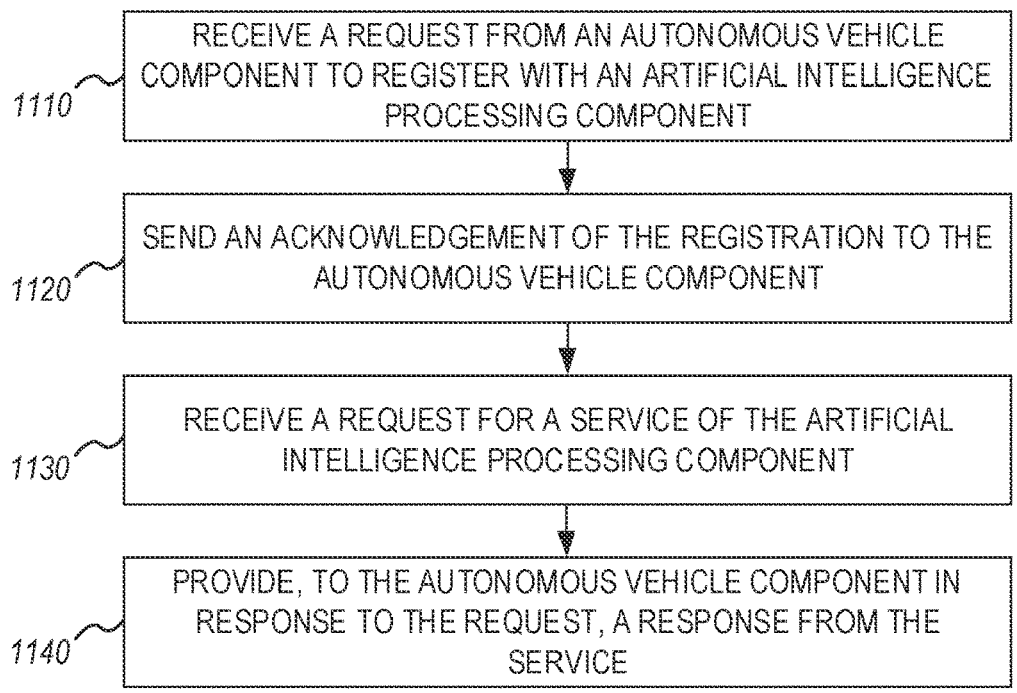
FIG. 11 illustrates a flowchart of an example process for interfacing a networked intelligence system with vehicle components, according to an example.

FIG. 11 illustrates a flowchart of an example process 1100 for interfacing a networked intelligence system with vehicle components, according to an example. The process 1100 may be performed by an edge device, for example via a processor implementing instructions stored in a memory. The edge device tray operate within an architecture of devices conforming to a standard from an ETI ENI standards group. The term "edge device" may include an "edge base station" or "edge node" (including a Multi-access Edge Computing (MEC) Node, for example) or a communication device in the vehicle that is interacting with such an edge base station or edge node. An edge base station or edge node may be located at a fixed geographic location, (e.g., at the roadside). In an example, a vehicle carries such an edge base station or edge node (part of its functionalities or in full)).

The process 1100 includes an operation 1110 to receive a request from a vehicle component to register with an artificial intelligence processing component. The artificial intelligence processing component may include a knowledge management component, a content awareness component, a cognition management component, a situational awareness component, a model-driven engineering component, a policy management component, or the like. The vehicle component may include a perception component, a decision and control component, a platform manipulation component, or the like.

The process 1100 includes an operation 1120 to send an acknowledgement of the registration to the vehicle component.

The process 1100 includes an operation 1130 to receive a request for a service of the artificial intelligence processing component. The service may include a denormalization service, an output generation service, a request for information, a request for processing, etc. In an example, the request may include a tag identifying a security compliance level.

The process 1100 includes an operation 1140 to provide, to the vehicle component in response to the request, a response from the service.

The process 1100 may further include receiving a de-registration request from the vehicle component and terminating a link between the vehicle component and the artificial intelligence processing component.

Figure 12:
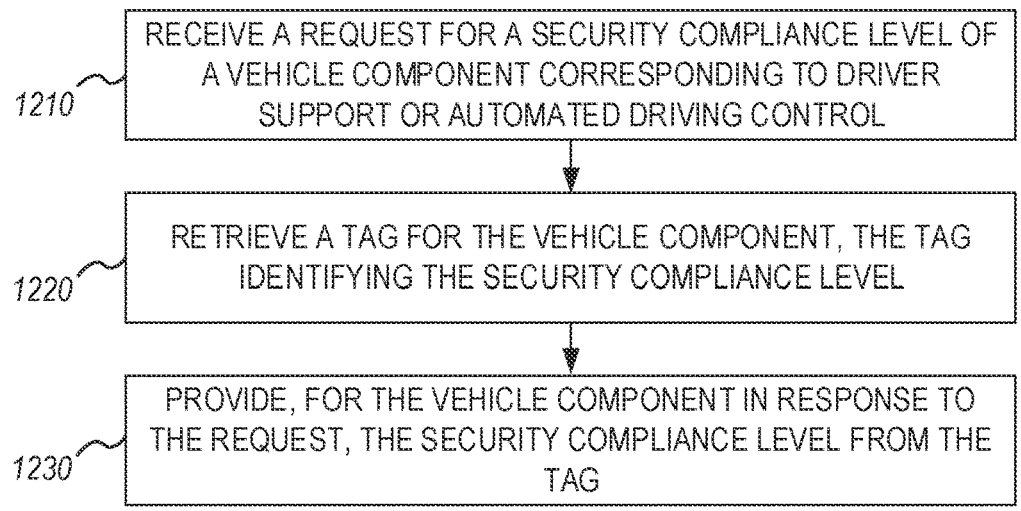
FIG. 12 illustrates a flowchart of an example process for tagging or providing tagging information related to a security profile of components of a networked architecture, according to an example.

FIG. 12 illustrates a flowchart of an example process 1200 for tagging or providing tagging information related to a security profile of components of a networked architecture, according to an example. Process 1200 may be performed by an edge device. The term "edge device" may include an "edge base station" or "edge node" (including a Multi-access Edge Computing (MEC) Node, for example) or a communication device in the vehicle that is interacting with such an edge base station or edge node. An edge base station or edge node may be located at a fixed geographic location, (e.g., at the roadside). In an example, a vehicle carries such an edge base station or edge node (part of its functionalities or in full)).

The process 1200 includes an operation 1210 to receive a request for a security compliance level of a vehicle component corresponding to driver support or automated driving control (e.g., a vehicle component). The security compliance level may include a low level (e.g., not compliant, or only compliant with a minimum requirement), a medium level (e.g., fully compliant with one regulation but only partially compliant with another, or compliant in a first jurisdiction but not in a second jurisdiction), and a highest level of compliance (e.g., fully compliant with a set of regulations or all regulations for a jurisdiction or world-wide). In an example, the security compliance level corresponds to Article 3 requirements of a Radio Equipment Directive regulation of the European Union or a Cybersecurity Act of the European Union. The request may be received from a device external to a network including the vehicle component and the edge device. The requesting device may be authenticated and receive private information or may receive public information.

The process 1200 includes an operation 1220 to retrieve a tag for the vehicle component, the tag identifying the security compliance level. In an example, the tag has a data structure including a tagging identifier, a tagging authority, a tagging confirmation code, public tagging information including the security compliance level, private tagging information shared only when the request is authorized, a security feature (e.g., a digital signature, a proof of origin, information enabling protection of its integrity, such as a hash), etc.), or the like.

The process 1200 includes an operation 1230 to provide, for the vehicle component in response to the request, the security compliance level from the tag.

Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Example 1 is an edge device configured to support operations of a vehicle comprising: processing circuitry; and a memory device comprising instructions stored thereon, wherein the instructions, when executed by the processing circuitry, configure the processing circuitry to perform operations to: receive a request from a vehicle component to register with an artificial intelligence processing component of the edge device; send an acknowledgement of the registration to the vehicle component; receive a request for a service of the artificial intelligence processing component; and provide, to the vehicle component in response to the request, a response from the service.

In Example 2, the subject matter of Example 1 includes, wherein the artificial intelligence processing component is one of a knowledge management component, a content awareness component, a cognition management component, a situational awareness component, a model-driven engineering component, or a policy management component.

In Example 3, the subject matter of Examples 1-2 includes, wherein the vehicle component is one of a perception component, a decision and control component, or a platform manipulation component.

In Example 4, the subject matter of Examples 1-3 includes, wherein the service is a denormalization service or an output generation service.

In Example 5, the subject matter of Examples 1-4 includes, wherein the instructions further cause the processing circuitry to: receive a de-registration request from the vehicle component; and terminate a link between the vehicle component and the artificial intelligence processing component.

In Example 6, the subject matter of Examples 1-5 includes, wherein the edge device operates within an architecture of devices conforming to a standard from an ETSI ENI standards group.

In Example 7, the subject matter of Examples 1-6 includes, wherein the request to register includes a tag identifying a security compliance level.

Example 8 is at least one machine-readable storage medium comprising instructions for operating an edge device configured to support operations of a vehicle, wherein the instructions, when executed by a processing circuitry of an edge computing device operable in an edge computing system, cause the processing circuitry to perform operations that: receive a request from a vehicle component to register with an artificial intelligence processing component of the edge device; send an acknowledgement of the registration to the vehicle component; receive a request for a service of the artificial intelligence processing component; and provide, to the vehicle, component in response to the request, a response from the service.

In Example 9, the subject matter of Example 8 includes, wherein the artificial intelligence processing component is one of a knowledge management component, a content awareness component, a cognition management component, a situational awareness component, a model-driven engineering component, or a policy management component.

In Example 10, the subject matter of Examples 8-9 includes, wherein the vehicle component is one of a perception component, a decision and control component, or a platform manipulation component.

In Example 11, the subject matter of Examples 8-10 includes, wherein the service is a denormalization service or an output generation service.

In Example 12, the subject matter of Examples 8-11 includes, wherein the instructions further cause the processing circuitry to: receive a de-registration request from the vehicle component; and terminate a link between the vehicle component and the artificial intelligence processing component.

In Example 13, the subject matter of Examples 8-12 includes, wherein the edge device operates within an architecture of devices conforming to a standard from an ETSI ENI standards group.

In Example 14, the subject matter of Examples 8-13 includes, wherein the request to register includes a tag identifying a security compliance level.

Example 15 is a method performed by a processor of an edge device configured to support operations of a vehicle, the method comprising: receiving a request from a vehicle component to register with an artificial intelligence processing component of the edge device; sending an acknowledgement of the registration to the vehicle component; receiving a request for a service of the artificial intelligence processing component; and providing, to the vehicle component in response to the request, a response from the service.

In Example 16, the subject matter of Example 15 includes, wherein the artificial intelligence processing component is one of a knowledge management component, a content awareness component, a cognition management component, a situational awareness component, a model-driven engineering component, or a policy management component.

In Example 17, the subject matter of Examples 15-16 includes, wherein the vehicle component is one of a perception component, a decision and control component, or a platform manipulation component.

In Example 18, the subject matter of Examples 15-17 includes, wherein the service is a denormalization service or an output generation service.

In Example 19, the subject matter of Examples 15-18 includes, receiving a de-registration request from the vehicle component; and terminating a link between the vehicle component and the artificial intelligence processing component.

In Example 20, the subject matter of Examples 15-19 includes, wherein the edge device operates within an architecture of devices conforming to a standard from an ETSI ENI standards group.

In Example 21, the subject matter of Examples 15-20 includes, wherein the request to register includes a tag identifying a security compliance level.

Example 22 is an edge device configured to support operations of a vehicle comprising: processing circuitry; and a memory device comprising instructions stored thereon, wherein the instructions, when executed by the processing circuitry, configure the processing circuitry to perform operations to: receive a request for a security compliance level of a vehicle component corresponding to driver support or automated driving control; retrieve a tag for the vehicle component, the tag identifying the security compliance level; and provide, for the vehicle component in response to the request, the security compliance level from the tag.

In Example 23, the subject matter of Example 22 includes, wherein the security compliance level includes a low level, a medium, level, and a highest level of compliance.

In Example 24, the subject matter of Examples 22-23 includes, wherein the security compliance level corresponds to Article 3 requirements of a Radio Equipment Directive regulation of the European Union.

In Example 25, the subject matter of Examples 22-24 includes, wherein the security compliance level corresponds to a Cybersecurity Act of the European Union.

In Example 26, the subject matter of Examples 22-25 includes, wherein the request is from a device on a network that is external to a network of the vehicle component and the edge device.

In Example 27, the subject matter of Examples 22-26 includes, wherein the tag has a data structure including a tagging identifier, a tagging authority, a tagging confirmation code, public tagging information including the security compliance level, private tagging information shared only when the request is authorized, and a security feature.

Example 28 is at least one machine-readable storage medium comprising instructions for operating an edge device configured to support operations of a vehicle, wherein the instructions, when executed by a processing circuitry of an edge computing device operable in an edge computing system, cause the processing circuitry to perform operations that: receive a request for a security compliance level of a vehicle component corresponding to driver support or automated driving control; retrieve a tag for the vehicle component, the tag identifying the security compliance level; and provide, for the vehicle component in response to the request, the security compliance level from the tag.

In Example 29, the subject matter of Example 28 includes, wherein the security compliance level includes a low level, a medium, level, and a highest level of compliance.

In Example 30, the subject matter of Examples 28-29 includes, wherein the security compliance level corresponds to Article 3 requirements of a Radio Equipment Directive regulation of the European Union.

In Example 31, the subject matter of Examples 28-30 includes, wherein the security compliance level corresponds to a Cybersecurity Act of the European Union.

In Example 32, the subject matter of Examples 28-31 includes, wherein the request is from a device on a network that is external to a network of the vehicle component and the edge device.

In Example 33, the subject matter of Examples 28-32 includes, wherein the tag has a data structure including a tagging identifier, a tagging authority, a tagging confirmation code, public tagging information including the security compliance level, private tagging information shared only when the request is authorized, and a security feature.

Example 34 is a method performed by a processor of an edge device configured to support operations of a vehicle, the method comprising: receiving a request for a security compliance level of a vehicle component corresponding to driver support or automated driving control; retrieving a tag for the vehicle component, the tag identifying the security compliance level; and providing, for the vehicle component in response to the request, the security compliance level from the tag.

In Example 35, the subject matter of Example 34 includes, wherein the security compliance level includes a low level, a medium, level, and a highest level of compliance.

In Example 36, the subject matter of Examples 34-35 includes, wherein the security compliance level corresponds to Article 3 requirements of a Radio Equipment Directive regulation of the European Union.

In Example 37, the subject matter of Examples 34-36 includes, wherein the security compliance level corresponds to a Cybersecurity Act of the European Union.

In Example 38, the subject matter of Examples 34-37 includes, wherein the request is from a device on a network that is external to a network of the vehicle component and the edge device.

In Example 39, the subject matter of Examples 34-38 includes, wherein the tag has a data structure including a tagging identifier, a tagging authority, a tagging confirmation code, public tagging information including the security compliance level, private tagging information shared only when the request is authorized, and a security feature.

Example 40 is at least one machine-readable medium including instructions that, when executed by processing circuitry, cause the processing circuitry to perform operations to implement of any of Examples 1-39.

Example 41 is an apparatus comprising means to implement of any of Examples 1-39.

Example 42 is a system to implement of any of Examples 1-39.

Example 43 is a method to implement of any of Examples 1-39.

In the above Detailed Description, various features may be grouped together to streamline the disclosure. However, claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An edge device configured to support operations of a vehicle comprising:
   processing circuitry; and
   a memory device comprising instructions stored thereon, wherein the instructions, when executed by the processing circuitry, configure the processing circuitry to perform operations to:
   receive a request for a security compliance level of a vehicle component corresponding to driver support or automated driving control;
   retrieve a tag for the vehicle component, the tag identifying the security compliance level;
   provide, for the vehicle component in response to the request, the security compliance level from the tag; and
   receive, in response to providing the security compliance level from the tag, an indication to deactivate the vehicle component based on the security compliance level failing to fulfill a compliance requirement.

2. The edge device of claim 1, wherein the security compliance level includes a low level, a medium, level, and a highest level of compliance.

3. The edge device of claim 1, wherein the security compliance level corresponds to Article 3 requirements of a Radio Equipment Directive regulation of the European Union.

4. The edge device of claim 1, wherein the security compliance level corresponds to a Cybersecurity Act of the European Union.

5. The edge device of claim 1, wherein the request is from a device on a network that is external to a network of the vehicle component and the edge device.

6. The edge device of claim 1, wherein the tag has a data structure including a tagging identifier, a tagging authority, a tagging confirmation code, public tagging information including the security compliance level, private tagging information shared only when the request is authorized, and a security feature, wherein to provide the security compliance level from the tag includes to provide the security compliance level from the tag in response to determining that an entity making the request for the security compliance level has a specified level of authorization.

7. At least one machine-readable storage medium comprising instructions for operating an edge device configured to support operations of a vehicle, wherein the instructions, when executed by a processing circuitry of an edge computing device operable in an edge computing system, cause the processing circuitry to perform operations that:
   receive a request for a security compliance level of a vehicle component corresponding to driver support or automated driving control;
   retrieve a tag for the vehicle component, the tag identifying the security compliance level;
   provide, for the vehicle component in response to the request, the security compliance level from the tag; and
   receive, in response to providing the security compliance level from the tag, an indication to deactivate the vehicle component based on the security compliance level failing to fulfill a compliance requirement.

8. The machine-readable storage medium of claim 7, wherein the security compliance level includes a low level, a medium, level, and a highest level of compliance.

9. The machine-readable storage medium of claim 7, wherein the security compliance level corresponds to Article 3 requirements of a Radio Equipment Directive regulation of the European Union.

10. The machine-readable storage medium of claim 7, wherein the security compliance level corresponds to a Cybersecurity Act of the European Union.

11. The machine-readable storage medium of claim 7, wherein the request is from a device on a network that is external to a network of the vehicle component and the edge device.

12. The machine-readable storage medium of claim 7, wherein the tag has a data structure including a tagging identifier, a tagging authority, a tagging confirmation code, public tagging information including the security compliance level, private tagging information shared only when the request is authorized, and a security feature, wherein to provide the security compliance level from the tag includes to provide the security compliance level from the tag in response to determining that an entity making the request for the security compliance level has a specified level of authorization.

* * * * *